United States Patent
Kamigaito

(10) Patent No.: US 11,643,280 B2
(45) Date of Patent: May 9, 2023

(54) ARTICLE CONVEYANCE APPARATUS AND METHOD OF CONTROLLING THE SAME

(71) Applicant: Ishida Co., Ltd., Kyoto (JP)

(72) Inventor: Satoru Kamigaito, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 17/406,021

(22) Filed: Aug. 18, 2021

(65) Prior Publication Data

US 2022/0063925 A1 Mar. 3, 2022

(30) Foreign Application Priority Data

Aug. 27, 2020 (JP) .............................. JP2020-143959

(51) Int. Cl.
B65G 43/08 (2006.01)

(52) U.S. Cl.
CPC ...... *B65G 43/08* (2013.01); *B65G 2203/0258* (2013.01); *B65G 2203/041* (2013.01)

(58) Field of Classification Search
CPC ...... B65G 2203/041; B65G 2203/0258; B65G 43/08
See application file for complete search history.

(56) References Cited

U.S. PATENT DOCUMENTS

| | | | |
|---|---|---|---|
| 11,535,459 B2 * | 12/2022 | Lautenschlager ...... | B65G 43/00 |
| 2016/0330225 A1 * | 11/2016 | Kroyzer ................. | G06N 20/00 |
| 2019/0056718 A1 | 2/2019 | Satou | |
| 2019/0118226 A1 * | 4/2019 | Shibasaki .......... | G05B 13/0265 |
| 2020/0023518 A1 | 1/2020 | Wang et al. | |

FOREIGN PATENT DOCUMENTS

| | | |
|---|---|---|
| JP | 2007-139422 A | 6/2007 |
| JP | 2020-011326 A | 1/2020 |

OTHER PUBLICATIONS

The extended European search report issued by the European Patent Office dated Jan. 17, 2022, which corresponds to European Patent Application No. 21191696.0-1205 and is related to U.S. Appl. No. 17/406,021.

* cited by examiner

*Primary Examiner* — Gene O Crawford
*Assistant Examiner* — Lester Rushin, III
(74) *Attorney, Agent, or Firm* — Studebaker & Brackett PC

(57) ABSTRACT

A method of controlling an article conveyance apparatus (1) includes steps of: (A) generating, with, as learning data, information regarding an amount of charge indicating a weight value of articles that a conveyer (20) conveys to a member disposed on a downstream side, information indicating a state of the articles on the conveyer, and a control parameter for the conveyer, a learning model that estimates the control parameter to be set for conveyance of the articles having a targeted weight; (B) performing conveyance control of the articles, based on the learning model; (C) performing selective switching between a production mode involved in actual production and a non-production mode not involved in the actual production, and causing the article conveyance apparatus to operate; and (D) collecting and storing, when the article conveyance apparatus operates in the non-production mode, as the learning data, the information regarding the amount of charge actually acquired and the control parameter.

8 Claims, 3 Drawing Sheets

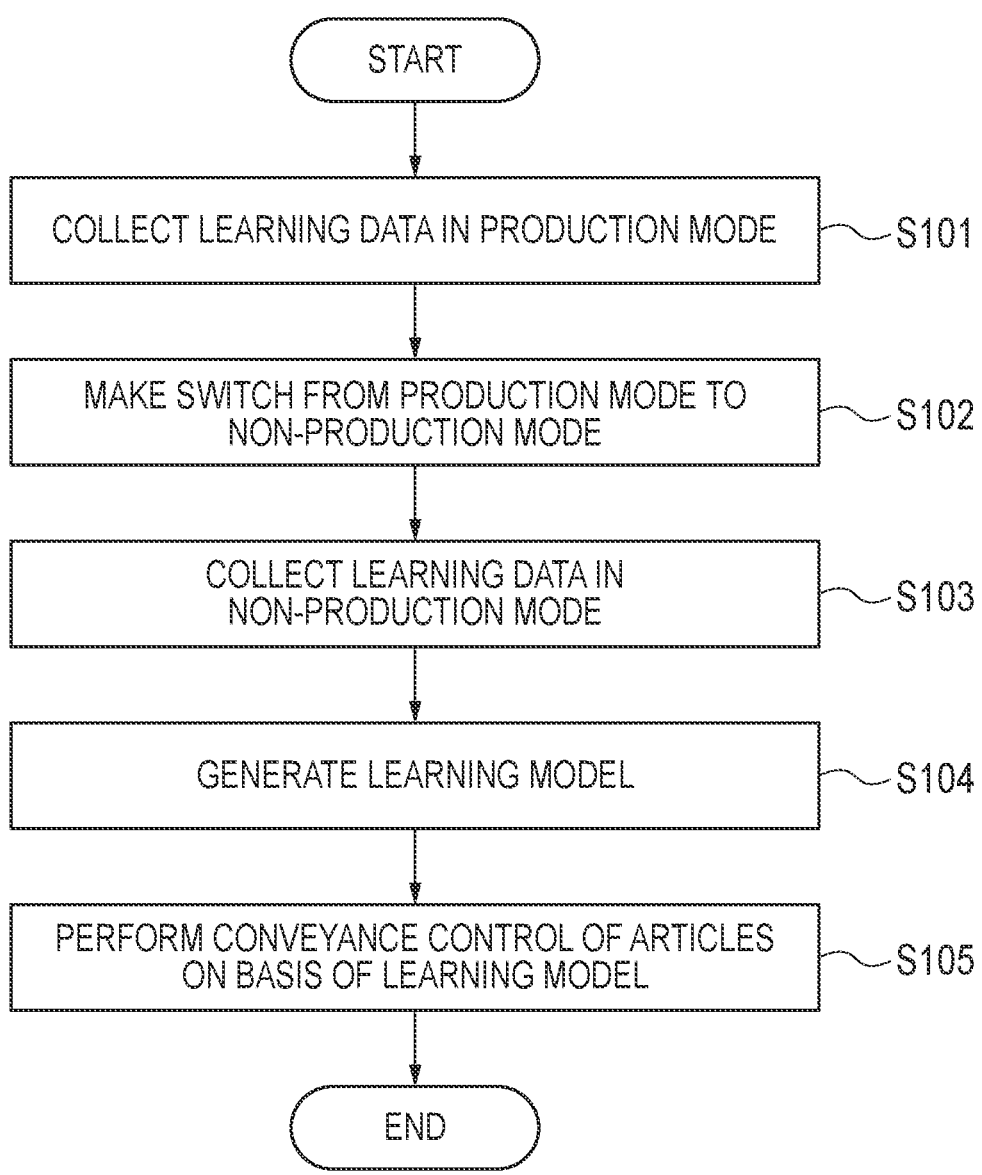

ARTICLE CONVEYANCE APPARATUS AND METHOD OF CONTROLLING THE SAME

CROSS-REFERENCE TO RELATED APPLICATION

This application is based upon and claims the benefit of priority from Japanese Patent Application No. 2020-143959 filed on Aug. 27, 2020 in Japan, the entire contents of which are incorporated herein by reference.

TECHNICAL FIELD

The present invention relates to an article conveyance apparatus and a method of controlling the article conveyance apparatus.

BACKGROUND ART

In recent years, technology for control of various apparatuses with deep learning has been progressively developed. For achievement of such control, a large amount of learning data needs acquiring with changes in various control parameters for the various apparatuses.

SUMMARY OF INVENTION

Technical Problem

However, in actual production with such apparatuses as above, for avoidance of deterioration in yield, the various control parameters are not allowed to be flexibly changed, resulting in a problem that sufficient learning data for the control is difficult to acquire.

Therefore, the present invention has been made in consideration of the problem, and an object of the present invention is to provide an article conveyance apparatus and a method of controlling the article conveyance apparatus that enable acquisition of sufficient learning data for control, with avoidance of deterioration in yield.

Solution to Problem

A method of controlling an article conveyance apparatus according to an embodiment, the method including steps of: (A) generating, with, as learning data, information regarding an amount of charge indicating a weight value of articles that a conveyer conveys to a member disposed on a downstream side, information indicating a state of the articles on the conveyer, and a control parameter for the conveyer, a learning model that estimates the control parameter to be set for conveyance of the articles having a targeted weight; (B) performing conveyance control of the articles, based on the learning model; (C) performing selective switching between a production mode involved in actual production and a non-production mode not involved in the actual production, and causing the article conveyance apparatus to operate; and (D) collecting and storing, when the article conveyance apparatus operates in the non-production mode, as the learning data, the information regarding the amount of charge actually acquired and the control parameter.

An article conveyance apparatus according to an embodiment including: a conveyer which conveys charged articles; a learning model generator generates, with, as learning data, information regarding an amount of charge indicating a weight value of the articles that the conveyer conveys to a member disposed on a downstream side, information indicating a state of the articles on the conveyer, and a control parameter for the conveyer, a learning model that estimates the control parameter to be set for conveyance of the articles having a targeted weight; and a controller which performs conveyance control of the articles, based on the learning model, wherein the controller: performs selective switching between a production mode involved in actual production and a non-production mode not involved in the actual production, and causes the article conveyance apparatus to operate, and collects and stores, in a case where the article conveyance apparatus operates in the non-production mode, as the learning data, the information regarding the amount of charge actually acquired and the control parameter.

Advantageous Effects of Invention

According to the embodiment, it is possible to provide an article conveyance apparatus and a method of controlling the article conveyance apparatus that enable acquisition of sufficient learning data for control, with avoidance of deterioration in yield.

BRIEF DESCRIPTION OF DRAWINGS

FIG. 3 is a flowchart of an exemplary method of controlling the combination weighing apparatus according to the embodiment.

DESCRIPTION OF EMBODIMENTS

Figure 1:
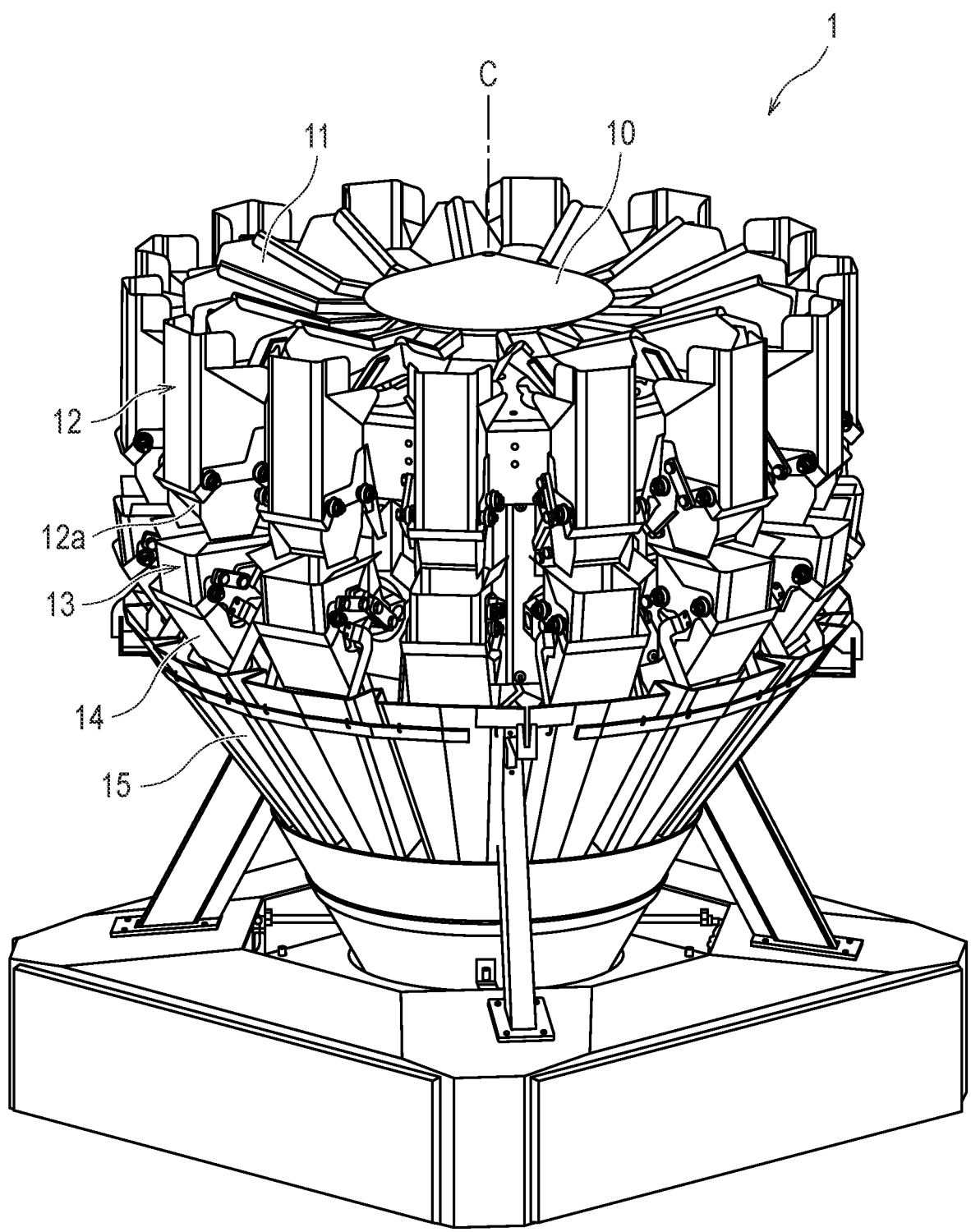
FIG. 1 is a perspective view of an exemplary entirety of a combination weighing apparatus according to an embodiment.

Hereinafter, the present embodiment will be described in detail with reference to the attached drawings. In the following description of the drawings, the same or similar parts are denoted by the same or similar reference symbols. However, note that the drawings are schematic, and ratios of dimensions are different from actual ones. Therefore, specific dimensions and the like are determined in consideration of the following description. Moreover, there may be portions where dimensional relationships or proportions are different among the drawings. In this specification and the drawings, elements having substantially the same function and configuration are denoted by the same reference numerals to omit redundant description, and elements not directly related to the present invention are omitted.

First Embodiment

Figure 2:
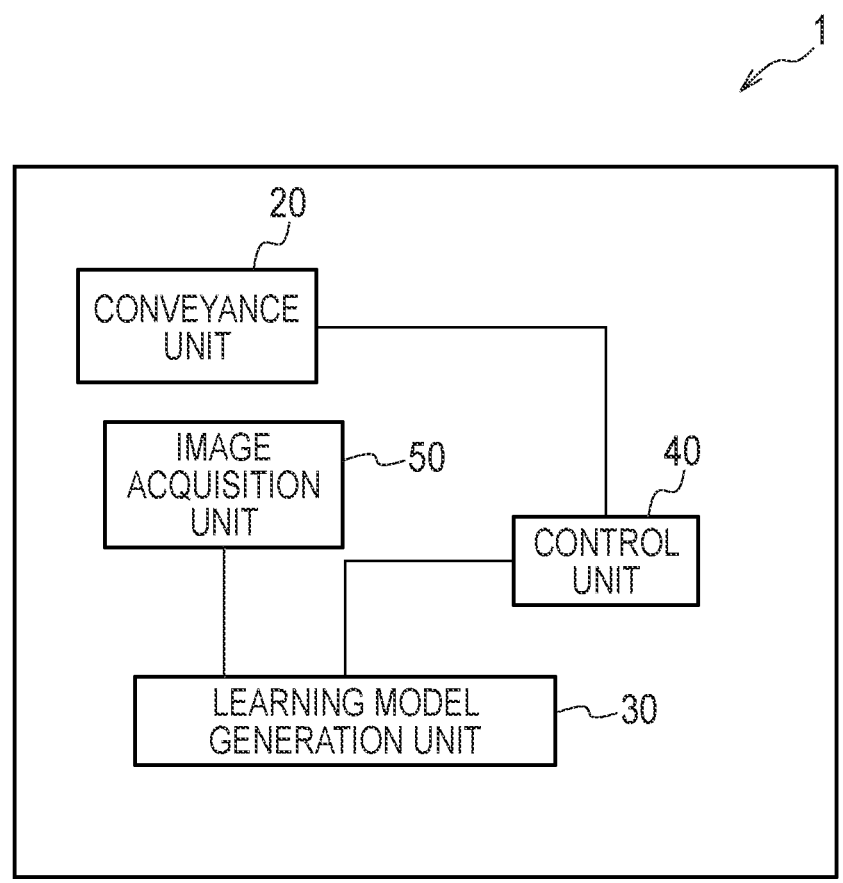
FIG. 2 illustrates exemplary functional blocks of the combination weighing apparatus according to the embodiment.

A combination weighing apparatus 1 as an exemplary article conveyance apparatus 1 in a first embodiment of the present invention will be described below with reference to FIGS. 1 to 3. FIG. 1 is a perspective view of an exemplary entirety of the combination weighing apparatus 1 according to the present embodiment. FIG. 2 illustrates exemplary functional blocks of the combination weighing apparatus 1 according to the embodiment. FIG. 3 is a flowchart of an exemplary method of controlling the combination weighing apparatus 1 according to the embodiment.

As illustrated in FIG. 1, the combination weighing apparatus 1 according to the present embodiment includes a distribution table 10, supply troughs 11, pool hoppers 12, weighing hoppers 13, booster hoppers 14, and a gathering discharge chute 15.

The distribution table 10 distributes weighing targets that fall from a supply apparatus (not illustrated), to the supply troughs 11. For example, the distribution table 10 in the present embodiment rotationally drives around a rotation axis C extending upward and downward, to convey the weighing targets radially outward in a circumferential distribution manner. However, the distribution table 10 is not limited to the configuration, and may have any configuration as long as having a function of conveying the weighing targets to the supply troughs 11.

The weighing targets are soft and sticky food, such as raw chicken. However, the weighing targets are not limited to this.

The supply troughs 11 each supply the weighing targets supplied from the distribution table 10, to the corresponding pool hopper 12 provided downstream. For example, the supply troughs 11 may each convey the weighing targets downstream by vibration.

The pool hoppers 12 each temporarily accumulate the weighing targets supplied from the supply trough 11. The pool hoppers 12 each have a lower portion provided with a gate 12*a*. In response to the open and shut operation of the gate 12*a*, the weighing targets accumulated in the pool hopper 12 are discharged to the weighing hopper 13 provided below the gate 12*a*.

The weighing hoppers 13 each temporarily accumulate the weighing targets discharged from the pool hopper 12. The weighing hoppers 13 are each connected to a weight detector (not illustrated).

The weighing hoppers 13 each have a lower portion provided with a gate (not illustrated). In response to the open and shut operation of the gate, the weighing targets accumulated in the weighing hopper 13 are discharged to the booster hopper 14 disposed below the gate.

The booster hoppers 14 each house the weighing targets supplied from the weighing hopper 13 and temporarily retains the weighing targets. The booster hoppers 14 each have a lower portion provided with a gate (not illustrated). In response to the open and shut operation of the gate, the weighing targets accumulated in the booster hopper 14 are discharged to the gathering discharge chute 15 disposed below the gate.

The gathering discharge chute 15 gathers the weighing targets discharged from a plurality of booster hoppers 14 and drops the gathered weighing targets downward.

As illustrated in FIG. 2, the combination weighing apparatus 1 includes, as functional blocks, a conveyance unit (conveyer) 20, a learning model generation unit (learning model generator) 30, and a control unit (controller) 40. The combination weighing apparatus 1 may further include an image acquisition unit (image acquirer) 50.

The conveyance unit 20 conveys charged articles. For example, the conveyance unit 20 includes the distribution table 10 or the supply troughs 11. In the present specification, below given will be an exemplary case where the supply troughs 11 are provided as the conveyance unit 20.

The image acquisition unit 50 acquires an image of articles placed on the supply troughs 11 (conveyance unit 20). For example, the image acquisition unit 50 may be an arbitrary type of camera.

The learning model generation unit 30 generates a learning model that estimates a control parameter to be set for conveyance of articles having a targeted weight by each supply trough 11.

For the learning model, as learning data, used are information regarding the amount of charge indicating the weight value of articles that the supply troughs 11 each convey to the member disposed on the downstream side (e.g., the pool hopper 12), information indicating the state of articles on each supply trough 11, and the control parameter for each supply trough 11 (conveyance unit 20).

For example, the learning model generation unit 30 generates a learning model, for example, by machine learning or deep learning.

Here, for example, the weight value of articles that the supply troughs 11 each convey to the member disposed on the downstream side corresponds to the weight value of articles supplied from each supply through 11 to the weighing hopper 13 through the pool hopper 12, namely, the weight value acquired by the weight detector (load cell) connected to the weighing hopper 13.

Note that the information regarding the amount of charge may be the weight value of articles or may be an arbitrary value corresponding to the weight value of articles.

As the control parameter for each supply trough 11, for example, the duration of vibration of each supply trough 11 or the voltage to be applied for vibration of each supply trough 11 may be targeted. Here, the control parameter includes a first control parameter and a second control parameter, as described later.

Furthermore, the information indicating the state of articles on each supply trough 11 (conveyance unit 20) may be, for example, an image of articles acquired by the image acquisition unit 50.

Specifically, with the learning data collected and stored by the control unit 40, the learning model generation unit 30 generates the learning model.

The learning model generation unit 30 may use, as the information regarding the amount of charge, the image of articles acquired by the image acquisition unit 50.

On the basis of the learning model generated by the learning model generation unit 30, the control unit 40 performs conveyance control of articles on the conveyance unit 20.

The control unit 40 performs selective switching between a production mode involved in actual production and a non-production mode not involved in actual production and causes the combination weighing apparatus 1 to operate.

Here, the production mode is a mode in which the combination weighing apparatus 1 performs a weighing job for weighing targets, for example, in a production line.

Meanwhile, the non-production mode is a mode in which the combination weighing apparatus 1 discharges all weighing targets accumulated in the combination weighing apparatus 1 (namely, a mode in which the combination weighing apparatus 1 performs complete discharge) or a mode in which the combination weighing apparatus 1 drives as a test.

In a case where the combination weighing apparatus 1 operates in the non-production mode, the control unit 40 collects and stores, as learning data, the information regarding the amount of charge actually acquired and the control parameter.

This configuration enables, in a case where no actual production is performed in the combination weighing apparatus 1, namely, in a case where the combination weighing apparatus 1 operates in the non-production mode, collection of learning data with a flexible change in the control parameter without concern for deterioration in yield.

In a case where the combination weighing apparatus 1 operates in the production mode, the control unit 40 may collect and store, as learning data, the information regarding the amount of charge actually acquired and the control parameter.

This configuration enables, in a case where actual production is performed in the combination weighing apparatus 1, namely, in a case where the combination weighing apparatus 1 operates in the production mode, collection of the learning data according to the control parameter used in actual production, so that the learning model can be generated efficiently.

Specifically, in a case where the combination weighing apparatus 1 operates in the production mode, the control unit 40 may collect and store, as learning data, the first control parameter and the information regarding the amount of charge due to the first control parameter.

Note that the first control parameter may be the control parameter collected during a predetermined period from the combination weighing apparatus 1 operating in the production mode or may be a parameter in a predetermined range determined in advance. Here, the predetermined range corresponds to the range of the control parameter usable in the combination weighing apparatus 1 operating in the production mode.

This configuration enables collection of learning data with the combination weighing apparatus 1 performing actual production.

In a case where the combination weighing apparatus 1 operates in the non-production mode, the control unit 40 collects and stores, as learning data, the second control parameter and the information regarding the amount of charge due to the second control parameter.

Note that the second control parameter is different from the first control parameter in the entirety of the control parameter acceptable by the combination weighing apparatus 1. Here, the second control parameter may be the remaining parameter different from the first control parameter in the entirety of the control parameter acceptable by the combination weighing apparatus 1 or may be part of the remaining parameter different from the first control parameter in the entirety of the control parameter acceptable by the combination weighing apparatus 1.

This configuration enables collection of only the learning data regarding the control parameter not collected with the combination weighing apparatus 1 operating in the production mode, so that sufficient learning data for conveyance control can be acquired efficiently.

An exemplary operation of the combination weighing apparatus 1 according to the embodiment will be described below with reference to FIG. 3.

As illustrated in FIG. 3, in step S101, in accordance with an instruction from an operator, the control unit 40 of the combination weighing apparatus 1 causes the combination weighing apparatus 1 to operate in the production mode, and collects and stores the learning data according to the first control parameter.

In step S102, in accordance with an instruction from the operator, the control unit 40 of the combination weighing apparatus 1 switches the mode of the combination weighing apparatus 1 from the production mode to the non-production mode.

In step S103, the control unit 40 of the combination weighing apparatus 1 collects and stores the learning data according to the second control parameter, from the combination weighing apparatus 1 operating in the non-production mode.

In step S104, the learning model generation unit 30 of the combination weighing apparatus 1 generates a learning model, with the learning data collected and stored by the control unit 40.

In step S105, the control unit 40 of the combination weighing apparatus 1 performs conveyance control of articles on the conveyance unit 20, on the basis of the learning model generated by the learning model generation unit 30.

According to the present embodiment, sufficient learning data for conveyance control in the combination weighing apparatus 1 can be acquired with avoidance of deterioration in yield.

The embodiment of the present invention has been described in detail above. It is obvious to a person skilled in the art that the present invention is not limited to the embodiment in the present specification. The present invention can be carried out in aspects corrected and altered without departing from the gist and scope of the present invention in the claims. Therefore, the present specification is intended for exemplificative description and thus does not have any limitative meanings to the present invention.

In the embodiment, the combination weighing apparatus 1 has been exemplarily described as the article conveyance apparatus 1. However, the article conveyance apparatus 1 is not limited to the combination weighing apparatus 1, and thus may be, for example, a food conveyance apparatus that supplies food to the combination weighing apparatus 1.

REFERENCE SIGNS LIST

1 Article conveyance apparatus, Combination weighing apparatus
10 Distribution table
11 Supply trough
12 Pool hopper
12a Gate
13 Weighing hopper
14 Booster hopper
15 Gathering discharge chute
20 Conveyance unit
30 Learning model generation unit
40 Control unit
50 Image acquisition unit

What is claimed is:

1. A method of controlling an article conveyance apparatus, the method comprising steps of:
   (A) generating, with, as learning data, information regarding an amount of charge indicating a weight value of articles that a conveyer conveys to a member disposed on a downstream side, information indicating a state of the articles on the conveyer, and a control parameter for the conveyer, a learning model that estimates the control parameter to be set for conveyance of the articles having a targeted weight;
   (B) performing conveyance control of the articles, based on the learning model;
   (C) performing selective switching between a production mode involved in actual production and a non-production mode not involved in the actual production, wherein the non-production mode is a mode in which the article conveyance apparatus discharges all the articles accumulated in the article conveyance apparatus or is a mode in which the article conveyance apparatus drives as a test, and causing the article conveyance apparatus to operate; and (D) collecting and storing, when the article conveyance apparatus operates in the non-production mode, as the learning data, the information regarding the amount of charge actually acquired and the control parameter.

2. The method of controlling an article conveyance apparatus according to claim 1, wherein
the step (D) includes:
collecting and storing, in a case where the article conveyance apparatus operates in the production mode, as the learning data, the information regarding the amount of charge actually acquired and the control parameter.

3. The method of controlling an article conveyance apparatus according to claim 2, wherein
the control parameter includes a first control parameter and a second control parameter, and
the step (D) includes:
collecting, in the case where the article conveyance apparatus operates in the production mode, as the learning data, the first control parameter and the information regarding the amount of charge when using the first control parameter; and
collecting, in the case where the article conveyance apparatus operates in the non-production mode, as the learning data, the second control parameter and the information regarding the amount of charge when using the second control parameter.

4. The method of controlling an article conveyance apparatus according to claim 1, wherein
in the step (A), a captured image of the articles is used as the information indicating the state of the articles.

5. An article conveyance apparatus comprising:
a conveyer which conveys charged articles;
a learning model generator generates, with, as learning data, information regarding an amount of charge indicating a weight value of the articles that the conveyer conveys to a member disposed on a downstream side, information indicating a state of the articles on the conveyer, and a control parameter for the conveyer, a learning model that estimates the control parameter to be set for conveyance of the articles having a targeted weight; and
a controller which performs conveyance control of the articles, based on the learning model, wherein
the controller:
performs selective switching between a production mode involved in actual production and a non-production mode not involved in the actual production, wherein the non-production mode is a mode in which the article conveyance apparatus discharges all the articles accumulated in the article conveyance apparatus or is a mode in which the article conveyance apparatus drives as a test, and causes the article conveyance apparatus to operate, and
collects and stores, in a case where the article conveyance apparatus operates in the non-production mode, as the learning data, the information regarding the amount of charge actually acquired and the control parameter.

6. The article conveyance apparatus according to claim 5, wherein
the controller collects and stores, in a case where the article conveyance apparatus operates in the production mode, as the learning data, the information regarding the amount of charge actually acquired and the control parameter.

7. The article conveyance apparatus according to claim 6, wherein
the control parameter includes a first control parameter and a second control parameter, and
the controller:
collects and stores, in the case where the article conveyance apparatus operates in the production mode, as the learning data, the first control parameter and the information regarding the amount of charge when using the first control parameter, and
collects and stores, in the case where the article conveyance apparatus operates in the non-production mode, as the learning data, the second control parameter and the information regarding the amount of charge when using the second control parameter.

8. The article conveyance apparatus according to claim 5, further comprising:
an image acquirer which acquires an image of the articles placed on the conveyer, wherein
the learning model generator uses the image of the articles as the information indicating the state of the articles.

* * * * *